United States Patent Office 3,649,523
Patented Mar. 14, 1972

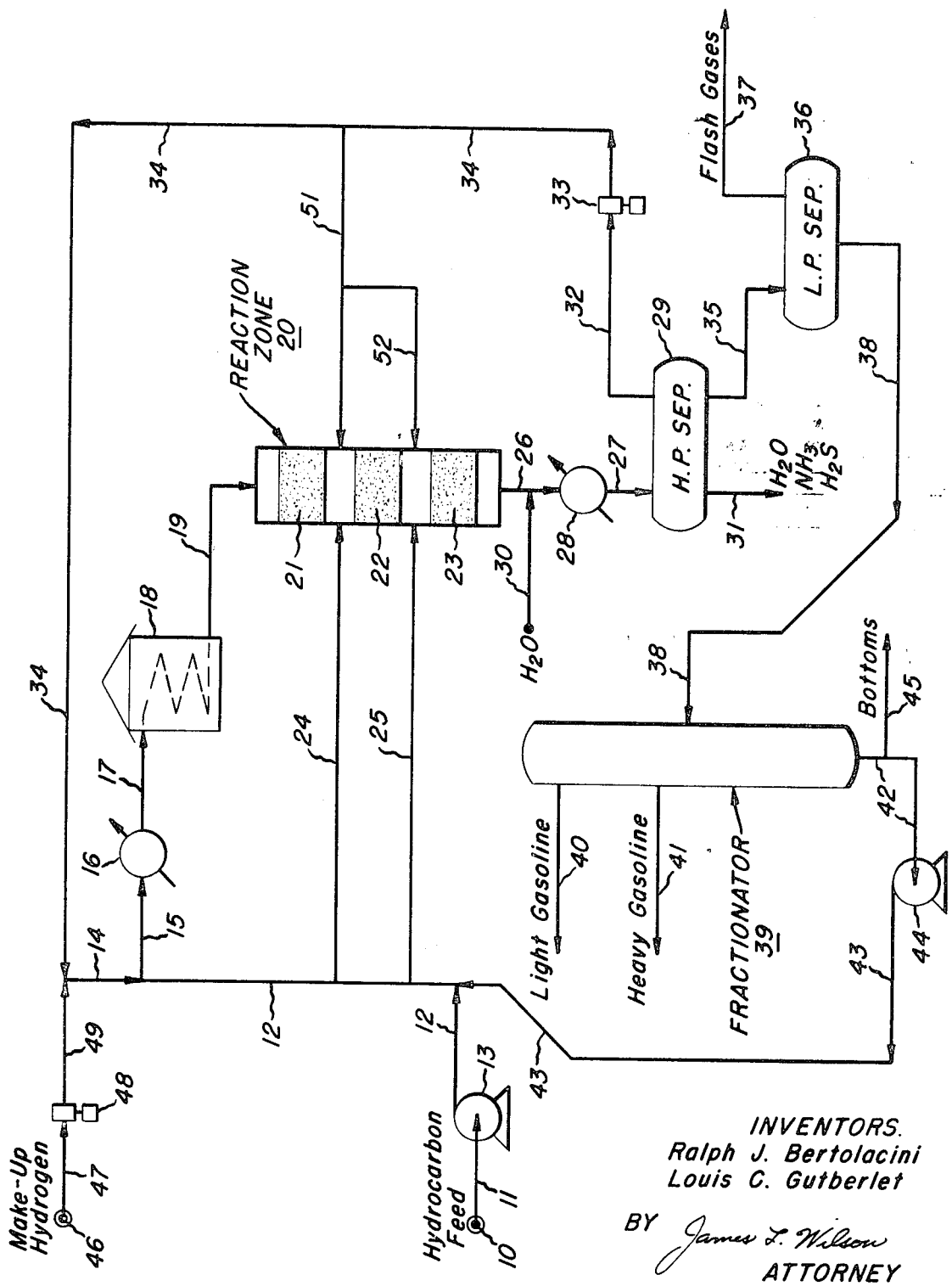

3,649,523
HYDROCRACKING PROCESS AND CATALYST
Ralph J. Bertolacini, Chesterton, and Louis C. Gutberlet, Crown Point, Ind., assignors to Standard Oil Company, Chicago, Ill.
Filed Apr. 10, 1969, Ser. No. 814,996
Int. Cl. C10g *13/02;* C01b *33/28;* C07c *2/58*
U.S. Cl. 208—111
21 Claims

ABSTRACT OF THE DISCLOSURE

The catalyst comprises Group VI–A and Group VIII metals and/or their compounds and an acidic support comprising large-pore crystalline aluminosilicate material and a porous support material selected from the group consisting of alumina, aluminum phosphate, and silica. Preferred Group VI–A metals are molybdenum and tungsten. Preferred Group III metals are cobalt and nickel. The preferred large-pore crystalline aluminosilicate material is ultrastable, large-pore crystalline aluminosilicate material.

The processes are hydrocarbon conversion processes, a typical example of which is a hydrocracking process. The hydrocracking process comprises contacting in a hydrocracking reaction zone under hydrocracking conditions and in the presence of hydrogen petroleum hydrocarbon fractions with the catalyst of the present invention.

BACKGROUND OF THE INVENTION

The present invention is directed to a catalytic composition and to petroleum hydrocarbon conversion processes employing that catalytic composition. More particularly, it is directed to a process for treating mineral oils, which results in a chemical alteration of at least some of the hydrocarbon molecules of the mineral oils to form lower-molecular-weight molecules and mineral oils having different properties, and to the catalytic composition employed in such a process.

There are a large number of processes for hydrocracking petroleum hydrocarbon feedstocks and numerous catalysts that are used in these processes. Some of these processes can be used only to hydrocrack feedstocks which contain only low amounts of nitrogen compounds; while others adequately convert to lower-molecular-weight-hydrocarbon compounds feedstocks which contain substantial amounts of nitrogen compounds. Many of the latter processes comprise two stages, a feed preparation stage and a hydrocracking stage, the two stages operating with different catalysts. The first stage, in general, contains a hydrodenitrogenation and hydrodesulfurization catalyst; the second stage, a hydrocracking catalyst. While many of the processes comprise two stages, some comprise only one stage, which may operate effectively with one catalyst or with two or more catalysts.

It is well-known by those having ordinary skill in the art that catalysts that are useful for the hydrodenitrogenation and/or hydrodesulfurization of petroleum hydrocarbon streams, in general, comprise a hydrogenation component, such as cobalt, molybdenum, nickel, tungsten, other sulfuractive metals, their compounds, or mixtures thereof, and a non-acidic or weakly acidic support, such as activated alumina. Typical hydrocracking catalysts comprise a hydrogenation component, such as cobalt, molybdenum, nickel, platinum, palladium, their compounds, or mixtures thereof, and an acidic cracking component. Such acidic cracking component may be a mixture of refractory inorganic oxides, such as silica-alumina, or boria-alumina; or an acid-treated inorganic oxide, such as a fluorided alumina; or a mixture of a specific type of crystalline aluminosilicate material and a refractory inorganic oxide, such as Y-type molecular sieves and silica-alumina.

A new catalytic composition has been developed, which catalytic composition can be used in various hydrocarbon conversion processes. A hydrocracking process employing this catalytic composition provides improved yields of heavy naphtha.

SUMMARY OF THE INVENTION

A new catalytic composition has been developed. Broadly, this catalytic composition comprises as a hydrogenation component a member selected from the group consisting of (1) a metal from Group VI–A of the Periodic Table of Elements and a metal from Group VIII of the Periodic Table of Elements, (2) their oxides, (3) their sulfides, and (4) mixtures thereof and a co-catalytic acidic support comprising large-pore crystalline aluminosilicate material and a porous support material selected from the group consisting of alumina, aluminum phosphate, and silica. The large-pore crystalline aluminosilicate material may be ultrastable, large-pore crystalline aluminosilicate material. Preferably, the large-pore crystalline aluminosilicate material is suspended in a matrix of the porous support material. The support is prepared by blending in a finely divided state the large-pore crystalline aluminosilicate material with a sol or gel of the porous support material, followed by drying. The large-pore crystalline aluminosilicate material is present in an amount within the range of about 5 weight percent to about 70 weight percent, based upon the weight of said support; the preferred amount is in excess of 30 weight percent, based upon the weight of said support.

The preferred Group VI–A metals are molybdenum and tungsten, while the preferred Group VIII metals are cobalt and nickel. If the hydrogenation component of the catalyst comprises cobalt and molybdenum and/or their compounds, the cobalt would be present in an amount within the range of about 2 to about 5 weight percent, calculated as CoO and based upon the weight of the catalyst, and the molybdenum would be present in an amount within the range of about 4 to about 15 weight percent, calculated as $MoO_3$ and based upon the total catalyst weight. If the hydrogenation component of the catalytic composition of the present invention comprises nickel and tungsten and/or their compounds, the nickel and tungsten may be present, broadly, in a total amount within the range of about 0.02 to about 0.15 gram-atom of nickel and tungsten per 100 grams of catalyst and in a tungsten-to-nickel ratio within the range of about 0.5 to about 5.0.

The hydrocarbon conversion processes of the present invention comprises contacting petroleum hydrocarbons in a hydrocarbon conversion reaction zone under hydrocarbon conversion conditions and in the presence of hydrogen with the catalytic composition of the present invention.

The hydrocracking process of the present invention comprises contacting a petroleum hydrocarbon fraction in a hydrocracking reaction zone under hydrocracking conditions and in the presence of hydrogen with the catalytic composition of the present invention.

BRIEF DESCRIPTION OF THE DRAWING

The accompanying drawing is a highly simplified schematic flow diagram of a preferred embodiment of a process of the present invention. In this embodiment, the process is a process for the hydrocracking of petroleum hydrocarbons. Certain auxiliary equipment, such as valves, pumps, heat exchangers, and the like, are not shown, but would be recognized easily by those skilled in the art to be employed at selected points along the flow path of the process.

DESCRIPTION AND PREFERRED EMBODIMENTS

Two important processes for the conversion of petroleum hydrocarbon fractions are hydrodenitrogenation processes and hydrocrcking processes. A hydrodenitrogenation process and a hydrocracking process, each employing the catalytic composition of the present invention, are embodiments of the present invention.

A hydrodenitrogenation process is a petroleum refining process wherein the nitrogen content of a petroleum hydrocarbon feed stock is substantially reduced at elevated temperature and pressure in the presence of a hydrogen-containing gas and a hydrodenitrogenation catalyst. Hydrogen is consumed in the conversion of organic nitrogen to ammonia. Furthermore, at least a portion of any sulfur that is present in any particular hydrocarbon feedstock is converted to hydrogen sulfide.

In a typical hydrodenitrogenation process, naphthas, gas oils, and even full boiling range hydrocarbon feedstocks may be treated to have their nitrogen contents substantially reduced. The feedstocks may boil in a range of about 350° F. to about 1,000° F., or above, and may contain up to 2,000 p.p.m. nitrogen, or more.

In the hydrodenitrogenation process of the present invention, the feedstock to be treated is contacted in the hydrodenitrogenation reaction zone with the hereinafter-described catalyst in the presence of hydrogen-affording gas. An excess of hydrogen is maintained in the reaction zone. Advantageously, a hydrogen-to-oil ratio of at least 5,000 standard cubic feet of hydrogen per barrel of feed (s.c.f.b.) is employed, and the hydrogen-to-oil ratio may range up to 40,000 s.c.f.b. Preferably a hydrogen-to-oil ratio of about 10,000 to about 25,000 s.c.f.b. is employed. The total pressure usually is between about 500 pounds per square inch gauge (p.s.i.g.) and about 5,000 p.s.i.g. and, preferably, between about 1,000 p.s.i.g. and about 2,000 p.s.i.g. The average catalyst bed temperature is within the range of about 400° F. to about 800° F. and, preferably, in a range of about 650° F. to about 750° F. The liquid hourly space velocity (LHSV) typically is within the range of about 0.1 to about 20 volumes of hydrocarbon per hour per volume of catalyst, and preferably within the range of about 0.5 to about 5 volumes of hydrocarbon per hour per volume of catalyst.

For use in the hydrodenitrogenation process of the present invention, the catalyst may be pretreated for several hours under a pressure within the range of about 0 p.s.i.g. to about 2,000 p.s.i.g. in flowing hydrogen at a temperature within the range of about 350° F. to about 750° F. The hydrogen flow rate may be within the range of about 20 standard cubic feet per hour per pound of catalyst (s.c.f.h.p.) to about 200 s.c.f.h.p. Typically, the pressure and hydrogen flow rate are the same as those to be used in subsequent feed processing. Alternatively, a hydrogen stream containing small amounts of hydrogen sulfide, e.g., up to about 10 volume percent, may also be used to pretreat the catalyst.

Hydrocracking is a general term which is applied to petroleum refining processes wherein hydrocarbon feedstocks which have relatively high molecular weights are converted to lower-molecular-weight hydrocarbons at elevated temperature and pressure in the presence of a hydrocracking catalyst and a hydrogen-containing gas. Hydrogen is consumed in the conversion of organic nitrogen and sulfur to ammonia and hydrogen sulfide, respectively, in the destruction of high-molecular-weight compounds into lower-molecular-weight compounds, and in the saturation of olefins and other unsaturated compounds. In hydrocracking processes, hydrocarbon feedstocks, such as gas oils that boil in the range of about 350° F. to about 1,000° F., typically, catalytic cycle oils boiling between about 350° F. and 850° F., are converted to lower-molecular-weight products, such as gasoline-boiling range products and light distillates.

Typical hydrocarbons feedstocks contain nitrogen compounds in amounts such that the amount of nitrogen present is greater than 20 p.p.m. The nitrogen tends to reduce the activity of the catalyst used in the hydrocracking reaction. Such reduction in catalytic activity results in inefficient operation and poor product distribution and yields. As the nitrogen content increases, higher reaction temperatures are required to maintain a given conversion level. Generally, the nitrogen content of a hydrocarbon feedstock can be reduced by subjecting that feedstock to a feed-preparation treatment. In the such instance, the nitrogen compounds are converted into ammonia. In addition, sulfur is converted into hydrogen sulfide.

Generally, low-temperature hydrocracking processes for maximizing gasoline-boiling-range products employ two processing stages. In the first stage, the feed-preparation stage, the feedstock is hydro-treated to remove nitrogen and sulfur that are typically found in the usual refinery feedstocks. In the second stage, the hydrocracking stage, the pretreated hydrocarbon stream is converted to lower-boiling products.

There are also one-stage hydrocracking processes. In a one-stage process, the denitrogenation and desulfurization occur in the first part of the catalyst bed or in the first reactor or first two to three reactors of a multi-reactor system. Therefore, denitrogenation, desulfurization, and hydrocracking may be performed by the same catalyst in a one-stage process. But two different catalysts may be used; the first catalyst for the denitrogenation and desulfurization; the second catalyst, for the hydrocracking. However, ammonia and hydrogen sulfide formed from the denitrogenation and desulfurization, respectively, are passed over the second catalyst along with the hydrocarbons that are to be hydrocracked by the second catalyst. In a one-stage process, no separation step occurs between the first catalyst and the second catalyst whereby the ammonia and hydrogen sulfide are separated from the hydrocarbons.

The catalytic composition of the present invention may be used advantageously for hydrocracking of petroleum hydrocarbon fractions. It may be employed in either a one-stage hydrocracking process or a two-stage hydrocracking process.

For the hydrocracking process, the hydrocarbon feedstock to be charged may boil in the range between about 350° F. and about 1,000° F. When operating to maximize gasoline production, the feedstock preferably has an end-point not greater than about 700°–750° F. Typically, a light catalytic cycle oil, or a light virgin gas oil, or mixtures thereof, boiling in the range of from about 350° F. to about 650° F. is employed as a feedstock. The feed may be pretreated to remove comounds of sulfur and nitrogen. The feed may have a significant sulfur content, ranging from 0.1 to 3 weight percent and nitrogen may be present in an amount up to 500 p.p.m. or more. Temperature, space velocity, and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons have been found to be especially well-suited for providing a highly aromatic hydrocracked gasoline product. Advantageously, the feed contains at least about 35–40 percent aromatics and/or naphthenes.

In the hydrocracking process, the feedstock is mixed with a hydrogen-affording gas and prerheated to hydrocracking temperature, then transferred to one or more hydrocracking reactors. Advantageously, the feed is substantially completely vaporized before being introduced into the reactor system. For example, it is preferred that the feed be all vaporized before passing through more than about 20 percent of the catalyst bed in the reactor. In some instances, the feed may be mixed phase vapor-liquid, and the temperature, pressure, recycle, etc. may be then adjusted for the particular feedstock to achieve the desired degree of vaporization.

The feedstock is contacted in the hydrocracking reaction zone with the hereinafter-described catalyst in the presence of hydrogen-affording gas. Hydrogen is consumed in the hydrocracking process and an excess of hydrogen is maintained in the reaction zone. Advantageously, a hydrogen-to-oil ratio of at least 5,000 s.c.f.b. is employed, and the hydrogen-to-oil ratio may range up to 20,000 s.c.f.b. Preferably, about 8,000 to 15,000 s.c.f.b. is employed. A high hydrogen partial pressure is desirable from the standpoint of prolonging catalyst activity.

The hydrocracking reaction zone is operated under conditions of elevated temperature and pressure. The total hydrocracking pressure usually is between about 700 p.s.i.g. and 4,0000 p.s.i.g. and, preferably, between about 1,000 p.s.i.g. and 1,800 p.s.i.g. The hydrogen partial pressure, in general, is within the range of about 675 p.s.i.g. to about 3,970 p.s.i.g. The hydrocracking reaction is exothermic in nature and a temperature rise occurs across the catalyst bed. The average hydrocracking catalyst bed temperature is between about 650° F. and 850° F.; and, preferably, a temperature between about 680° F. and 800° F. is maintained. The LHSV typically is within the range of about 0.1 to about 10 volumes of hydrocarbon per hour per volume of catalyst, and preferably within the range of about 0.5 to about 5 volumes of hydrocarbon per hour per volume of catalyst. Optionally, the LHSV is within the range of about 1 to about 2.

The catalytic composition of the present invention may be used also for the disproportionation of petroleum hydrocarbons wherein alkyl groups of aromatic hydrocarbons are transferred from one molecule to another. This latter process comprises contacting the petroleum hydrocarbon stream in a hydrocarbon-conversion zone with a catalytic composition of this invention in the presence of a hydrogen-affording gas under suitable hydrocarbon disproportionation conditions.

For the disproportionation process, typical feedstocks are petroleum hydrocarbon streams which contain monocyclic and dicyclic aromatic hydrocarbons which boil below about 650° F. Such aromatic hydrocarbon streams may be a petroleum hydrocarbon fraction which contains aromatics, or it may be an aromatic hydrocarbon. For example, the feedstock may contain toluene, ortho-xylene, meta-xylene, and para-xylene, trimethylbenzenes, and tetramethylbenzenes. Typically, in the disproportionation process, the feedstocks is mixed with a hydrogen-affording gas and pre-heated to a suitable disproportionation temperature, and then transferred to the disproportionation reaction zone, which may contain one or more reactors. Advantageously, the feed is substantially completely vaporized before being introduced into the reaction zone.

The feedstock is contacted in the disproportionation reaction zone with the hereinatfer described catalyst in the presence of hydrogen-affording gas. Advantageously, a hydrogen-to-oil ratio of at least 1,000 s.c.f.b. is employed, and the hydrogen-to-oil ratio may range up to 50,000 s.c.f.b. Preferably, the hydrogen-to-oil ratio may range between about 5,000 s.c.f.b. and 30,000 s.c.f.b. Other operating conditions include an elevated temperature ranging between about 700° F. and about 1,100° F., preferably between about 850° F. and about 1,000° F., an elevated pressure ranging between about 100 p.s.i.g. and about 1,000 p.s.i.g., preferably between about 200 p.s.i.g. and about 500 p.s.i.g.; and a weight hourly space velocity (WHSV) ranging between about 0.1 and about 20 weight units of hydrocarbon per hour per weight unit of catalyst, preferably between about 1 and about 10 weight units of hydrocarbon per hour per weight unit of catalyst. The exothermic demethanation reaction that occurs in the disproportionation reaction zone may be controlled by the treatment of the catalyst with sulfur compounds, such as hydrogen sulfide and carbon disulfide, either prior to or at the start of the disproportionation reaction.

In addition to being a catalyst for hydrodenitrogenation, for hydrocracking, and for disproportionation, the catalytic composition of the present invention is a suitable catalyst for the isomerization of alkyl aromatics, the transalkylation between aromatic hydrocarbons, the hydrodealkylation of hydrocarbon-substituted aromatic compounds, and the reforming of the petroleum hydrocarbon naptha streams.

The catalytic composition of this invention comprises as a hydrogenation component a member selected from the group consisting of (1) a metal from Group VI–A of the Periodic Table of Elements and a metal from Group VIII of the Periodic Table of Elements, (2) their oxides, (3) their sulfides, and (4) mixtures thereof and a co-catalytic acidic support comprising large-pore crystalline aluminosilicate material and a porous support material selected from the group consisting of alumina, aluminum-phosphate, and silica.

The hydrogenation component may be deposited on the acidic support, or it may be incorporated into the acidic support by impregnation of heat decomposable salts of the desired metals. Each of the metals may be impregnated into the support separately or they may be co-impregnated into the support. Alternatively, the hydrogenation-component metals may be co-precipitated with a hydrogel of the porous support material. In this latter method, the finely divided crystalline aluminosilicate material is thoroughly blended into the hydrogel and then each metal of the hydrogenation component is added separately to the blend in the form of a heat-decomposable salt of that metal. The composite is subsequently dried and calcined to decompose the salts and to remove the undesired anions.

Two preferred combinations of metals for the hydrogenation component of the catalytic composition of the present invention are (1) cobalt and molybdenum and (2) nickel and tungsten.

If the hydrogenation component comprises cobalt and molybdenum and/or their compounds, cobalt is present in an amount within the range of about 2 weight percent to about 5 weight percent calculated as CoO and based upon the total weight of the catalyst. Molybdenum is present in an amount within the range of about 4 weight percent to about 15 weight percent, calculated as $MoO_3$, and based upon the total weight of the catalyst.

If the hydrogenation component of the catalytic composition of the present invention comprises nickel and tungsten and/or their compounds, the nickel and tungsten may be present in the amounts specified below. Broadly, the nickel and tungsten may be present in a total amount within the range of about 0.02 to about 0.15 gram-atom of nickel and tungsten per 100 grams of catalyst and in a tungsten-to-nickel ratio within the range of about 0.5 to about 5.0. Advantageously the nickel and tungsten may be present in a total amount within the range of about 0.04 to about 0.12 gram-atom of nickel and tungsten per 100 grams of catalyst and in a tungsten-to-nickel ratio within the range of about 1.5 to about 4.0. Preferably, the nickel and tungsten may be present in a total amount within the range of about 0.07 to about 0.11 gram-atom of nickel and tungsten per 100 grams of catalyst and in a tungsten-to-nickel ratio within the range of about 2 to about 3. The optimum tungsten-to-nickel ratio is 2.5.

The acidic support of the catalytic composition of the present invention comprises a large-pore crystalline aluminosilicate material and a porous support material. While there are several large-pore crystalline aluminosilicate materials that may be employed in the catalytic composition of the present invention, ultrastable, large-pore crystalline aluminosilicate material is the preferred aluminosilicate material. The acidic support may contain from about 5 weight percent to about 70 weight percent large-pore crystalline aluminosilicate material. Preferably, the acidic support may contain from about 30 weight percent to about 50 weight percent aluminosilicate material. It is preferred that the large-pore crystalline aluminosilicate material be distributed throughout and suspended in a porous matrix of the porous support material. The porous support material is a member selected from the group consisting of alumina, aluminum phosphate, and silica.

Characteristics of many large-pore crystalline aluminosilicate materials and methods for preparing them have been presented in the chemical art. Their structure comprises a network of relatively small aluminosilicate cavities which are interconnected by numerous pores. These pores are smaller than the cavities and have an essentially uniform diameter at their narrowest cross section. Basically, the network of cavities is a fixed three-dimensional and ionic network of silica and alumina tetrahedra. These tetrahedra are cross-linked by the sharing of oxygen atoms. Cations are included in the crystal structure of the aluminosilicate material to balance the electrovalence of the tetrahedra. Examples of such cations are metal ions, hydrogen ions, and hydrogen-ion precursors, such as ammonium ions. By means of the technique known as cation exchange, one cation may be exchanged for another.

The crystalline aluminosilicate materials that are employed in the catalytic composition of this invention are large-pore materials. By large-pore material is meant material that has pores which are sufficiently large to permit the passage thereinto of benzene molecules and larger molecules and the passage therefrom of reaction products. For use in petroleum hydrocarbon conversion processes, it is preferred to employ a large-pore aluminosilicate material having a pore size of at least 9 to 10 angstrom units. The large-pore crystalline aluminosilicate materials that are employed in the catalytic composition of this invention possess such a pore size.

The preferred ultrastable, large-pore crystalline aluminosilicate material is stable to exposure to elevated temperatures and stable to repeated wetting-drying cycles. Its stability is demonstrated by its surface area after calcination at 1725° F. After calcination at a temperature of 1725° F. for a period of two hours, there is retained a surface area of greater than 150 m.$^2$/gm. Moreover, its stability is demonstrated by its surface area after a steam treatment with an atmosphere of 25 percent steam at a temperature of 1525° F. for 16 hours. Its surface area after this steam treatment is greater than 200 m.$^2$/gm.

The ultrastable, large-pore crystalline aluminosilicate material exhibits extremely good stability toward wetting, which is defined as that ability of a particular aluminosilicate material to retain surface area or nitrogen-adsorption capacity after contact with water or water vapor. A sodium-form of the ultrastable, large-pore crystalline aluminosilicate material (about 2.15 weight percent sodium) was shown to have a loss in nitrogen-adsorption capacity that is less than 2 percent per wetting when tested for stability to wetting by subjecting the material to a number of consecutive cycles, each cycle consisting of a wetting and a drying.

The ultrastable, large-pore crystalline aluminosilicate material employed in the catalytic composition of this invention exhibits a cubic unit cell dimension and hydroxyl infrared bands that distinguish it from other aluminosilicate materials.

The cubic unit cell dimension of the ultrastable, large-pore crystalline aluminosilicate material is within the range of about 24.20 angstrom units to about 24.55 angstrom units.

The hydroxyl infrared bands obtained with the ultrastable, large-pore crystalline aluminosilicate material are a band near 3750 cm.$^{-1}$, a band near 3700 cm.$^{-1}$, and a band near 3625 cm.$^{-1}$. The band near 3750 cm.$^{-1}$ may be found on many of the hydrogen-form and decationized aluminosilicate materials, but the band near 3700 cm.$^{-1}$ and the band near 3625 cm.$^{-1}$ are characteristic of the ultrastable, large-pore crystalline aluminosilicate material that is employed in the catalytic composition of the present invention.

The ultrastable, large-pore crystalline aluminosilicate material is also characterized by an alkali metal content of less than 1 percent.

An example of the ultrastable, large-pore crystalline aluminosilicate material is Z-14US, which is described in the United States Patent 3,293,192.

The co-catalytic acidic support of the catalytic composition of the present invention may be prepared by various well-known methods and formed into pellets, beads, and extrudates of the desired size. For example, the large-pore crystalline aluminosilicate material may be pulverized into finely-divided material, and this latter material is then intimately admixed with the porous support material. The finely-divided crystalline aluminosilicate material may be admixed thoroughly with a hydrosol or hydrogel of the porous support material.

Where a thoroughly blended hydrogel is obtained, this hydrogel may be dried and broken into pieces of desired shapes and sizes. The hydrogel may also be formed into small spherical particles by conventional spray drying techniques or equivalent means.

A preferred embodiment of the hydrocarbon conversion process of this invention is the one-stage hydrocracking process that is depicted in the accompanying drawing. This embodiment is for the purpose of illustration only and is not intended to limit the scope of the present invention.

Referring to the drawing, fresh hydrocarbon feed boiling within the range of about 400° F. to about 632° F. and containing 0.25 weight percent sulfur and 159 parts per million nitrogen is obtained from feed source 10. This particular feed, a blend of 30 volume percent light virgin gas oil (LVGO) and 70 volume percent light catalytic cycle oil (LCCO) is pumped through lines 11 and 12 by means of pump 13. Hydrogen-affording gas is passed through line 14 and into line 12 to be intimately mixed with the fresh hydrocarbon feed therein. The resulting hydrogen-hydrocarbon mixture is passed through line 15, heat exchanger 16, and line 17 into furnace 18. The hot hydrogen-hydrocarbon mixture is then passed through line 19 into the top of hydrocarcking reaction zone 20. Hydrocracking reaction zone 20 is made up of a number of consecutive catalyst beds separated by inert refractory material, such as alumina balls. Catalysts beds 21, 22 and 23 are shown in the drawing. However, the number of three catalyst beds is in no way intended to limit the scope of the present invention and, conceivably, there could be more or less catalyst beds in the hydrocrocking reaction zone than the three shown.

The catalyst in each of these beds is a preferred embodiment of the catalytic composition of the present invention. The catalyst comprises cobalt and molybdenum and/or their oxides and/or sulfides on a co-catalytic acidic support comprising ultrastable, large-pore crystalline aluminosilicate material suspended in a porous matrix of alumina.

The cobalt is present as 2.5 weight percent CoO; the molybdenum is present as 10 weight percent MoO$_3$. The acidic support comprises about 35 weight percent ultrastable, large-pore crystalline aluminosilicate material, based upon the weight of the support.

The temperature of the hot hydrogen-hydrocarbon feed mixture to reactor 20 is within the range of about 650° F. to about 690° F. at the beginning of the run and is gradually increased as the run progresses in order to compensate for the gradual decline in the activity of the catalyst. Since the hydrocracking reaction is exothermic, the temperature of the reactants tends to increase as the reactants pass downward through the bed of the catalyst. In order to control the temperature increase and to limit the maximum temperature within the reactor, a liquid quench stream is introduced into the reaction zone 20 at the spaces between beds 21, 22, and 23 by means of lines 24 and 25. This liquid quench is fresh feed from feed line 12 and/or recycle oil from recycle line 43 described hereinafter.

The process conditions include a temperature of about 650° F. to about 850° F., a LHSV of about 1 to about 5, and a pressure of about 1250 p.s.i.g., and a hydrogen recycle rate of about 9,000 s.c.f.b. Effluent from the reaction zone 20 is passed through lines 26 and 27 and cooler 28 into high pressure separator 29. Wash water may be introduced into line 26 by way of line 30. In line 26, the wash water is mixed with the hydrocracked effluent and upon passing through cooler 28 and line 27 separates as an aqueous phase in the high-pressure separator 29. The wash water dissolves any ammonia and hydrogen sulfide that is present in the effluent and removes them therefrom. This wash water containing the dissolved ammonia and hydrogen sulfide is withdrawn from high-pressure separator 29 by way of line 31. The gas which separates from the liquid in high pressure separator 29 is withdrawn from high pressure separator 29 via line 32, compressed by gas compressor 33, and passed via line 34 to be recycled by way of line 34 into line 14 and introduced into the hydrocarbon stream that is passing through line 12 for subsequent charging into hydrocracking reaction zone 20.

The liquid hydrocarbons are withdrawn from high-pressure separator 29 via line 35 and are passed by way of line 35 into low-pressure separator 36. The gas phase from low-pressure separator 36, comprising primarily light hydrocarbons and hydrogen, is withdrawn via line 37 as flash gases, which are used conveniently as fuel gas. The liquid hydrocarbon layer from the low-pressure separator 36 is withdrawn therefrom via line 38 and passed through line 38 to and into fractionator 39. In fractionator 39, the liquid hydrocarbons are fractionated into a light-gasoline fraction, a heavy gasoline-fraction, and a bottoms fraction. The light-gasoline fraction is withdrawn from fractionator 39 by way of line 40; the heavy gasoline fraction, by way of line 41; and the bottoms fraction by way of line 42. The bottoms fraction is recycled via lines 42 and 43 and recycle pump 44, to be added to the fresh hydrocarbon feed in line 12, for introduction into the top of hydrocracking reaction zone 20 by way of lines 12, 15, 17, and 19, heat exchanger 16 and furnace 18 into quench lines 24 and 25 by way of line 12. Undesired bottoms material may be removed from the system by way of line 45.

The heavy gasoline fraction is withdrawn from fractionator 39 by way of line 41 for use in other refinery process units, such as a reformer. The light gasoline fraction is withdrawn by way of line 40 for use in gasoline blending. Although fractionator 39 is shown as only one column, it is to be understood that other satisfactory recovery systems may be used and are deemed to be within the scope of the present invention. Such other satisfactory recovery systems are known by those having ordinary skill in the art. Alternatively, a butane stream can also be withdrawn.

Make-up hydrogen from source 46 is passed through line 47 and compressed in compressor 48. The compressed make-up hydrogen is then passed through lines 49 and 14 to be admixed with the hydrogen-hydrocarbon mixture to be introduced into hydrocracking reaction zone 20.

Quench gas may alternatively be used to control the temperature in the hydrocracking reaction zone 20. This quench gas may be a portion of the hydrogen-containing recycle gas passing through line 34. It may be removed from line 34 by way of lines 51 and 52, for introduction into the hydrocracking reaction zone 20 at the interstices between the catalyst bed in hydrocracking reaction zone 20.

The following example is presented to facilitate a better understanding of the present invention. It is to be understood that this example is for the purpose of illustration only and is not to be regarded as a limitation of the scope of the present invention.

Each of the tests in the following example was conducted in typical bench-scale equipment, which employed a tubular stainless steel reactor and conventional product-recovery and analytical equipment. The reactor was 20 inches long and had an inside diameter of 0.622 inch. The reactor temperature was maintained by use of a hot molten salt bath of Du Pont HITEC. The internal reactor temperatures were measured by means of a co-axial thermocouple.

In each of the hydrocracking tests, a catalyst charge of 19 grams of granular material which would pass through a 12-mesh U.S. Sieve, but not a 20-mesh U.S. Sieve, was employed. The catalyst was supported in the lower one-third of the reactor on a layer of 4-millimeter Pyrex glass beads. The volume of reactor above the catalyst bed was empty. The catalyst bed occupied about 6 to about 9 inches of reactor length, depending upon the bulk density of the catalyst.

Prior to its hydrocracking test, each catalyst was pretreated at 1,250 p.s.i.g. and 500° F. for a period of 16-20 hours with hydrogen flowing at the rate of about 50 standard cubic feet per hour per pound of catalyst (s.c.f.m.p.). Hydrocarbon feed was started at 500° F. and the temperature was increased over a period of several hours until the desired conversion level was reached. Thereafter, temperature was adjusted to maintain approximately 77 weight percent conversion. Other processing conditions include a total pressure of 1,250 p.s.i.g., a LHSV within the range of about 0.9 cc. of hydrogen per hour per cc. of catalyst to about 1.1 cc. of hydrocarbon per hour per cc. of catalyst, a WHSV of about 1.38 grams of hydrocarbon per hour per gram of catalyst, and a hydrogen addition rate of about 12,000 s.c.f.b. The hydrocarbon feedstock employed was a low-sulfur blend of LVGO and LCCO. Its properties are shown in Table I.

TABLE I.—FEED PREPARATION

| | |
|---|---:|
| ASTM distillation, ° F.: | |
|   IBP | 398 |
|   10 vol. percent o.v.h.d. | 475 |
|   30 | 519 |
|   50 | 546 |
|   70 | 563 |
|   90 | 614 |
|   Maximum | 632 |
| Gravity, ° API | 27.5 |
| Refractive index, $n_D^{20}$ | 1.5026 |
| Sulfur, wt. percent | 0.25 |
| Nitrogen, p.p.m. | 159 |
| Molecular weight | 209 |
| Hydrocarbon type, vol. percent: | |
|   Paraffins | 23.5 |
|   Naphthenes | 42.2 |
|   Aromatics | 34.3 |

For each hydrocracking test, data were obtained from 1 to 13 days on stream. Weight balances were obtained on two-hour samples taken at intervals of at least 24 hours. Product recoveries were generally above 99.0 weight percent, based upon the weight of the hydrocarbon feed. Gas and liquid analyses were combined and normalized to 100 percent to obtain the conversion level. Product distributions were calculated to a total of 103 weight percent, based on hydrocarbon feed, to account for hydrogen consumption.

As used herein, conversion is defined as the percent of the total reactor effluent, both gas and liquid, that boils below a true boiling point of 380° F. This percent was determined by gas chromatography. The hydrocarbon product was sampled for analyses at intervals of not less than 24 hours. The sampling period was two hours, during which time the liquid product was collected under a Dry-Ice-acetone condenser to insure condensation of pentanes and heavier hydrocarbons. During this time, the hydrogen-rich off-gas was sampled and immediately analyzed for light hydrocarbons by isothermal gas chromatography. The liquid product was weighed an analyzed using a dual-column temperature-programmed gas chromatography equipped with 6 feet x ¼ inch columns of SF-96 on fire brick and thermal-conductivity detectors. Individual compounds were measured through methylcyclopentane. The valley in the chromatograph just ahead of the n-undecane peak was taken as the 380° F. point. The split between light and heavy naphtha (180° F.) was arbitrarily selected as a specified valley within the $C_7$-paraffin-naphthene group to conform with the split obtained by Oldershaw distillation of the product.

Temperature requirments for 77 percent conversion were calculated from the observed data by means of zero order kinetics and an activation energy of 35 kilocalories. Adjustment in temperature requirement was made also to a constant hydrogen-to-oil ratio of 12,000 s.c.f.b. using the equation:

$$\Delta T\ °\ F. = (1.3)(R - 12)$$

where R is the gas rate in 1,000 s.c.f.b.

The temperature required for 77 percent conversion was selected as the means for expressing the hydrocracking activity of the catalyst being tested. To eliminate irregular values that might be present at the start of the run, an estimated value for the temperature required for 77 percent conversion at 7 days on stream was obtained for each catalyst. To estimate these values, a plot showing the temperatures required for 77 percent conversion as ordinates and days on stream as abscissae was prepared and the value of the temperature at 7 days on stream was read from the smooth curve of this plot. This latter value was used to determine the activity of the catalyst that was employed in the test from the plotted data were obained.

The relative hydrocracking activity was obtained by using the following equation:

$$A = 100 e^{-\frac{\Delta E}{R}\left[\frac{1}{T_0} - \frac{1}{T}\right]}$$

where

A = the relative activitly of the tested catalyst,
E = 35,000 calories per gram-mole,
R = 1.987 calories per gram-mole per ° K.,
T = the temperature of the test for the 7th day in ° K., and
$T_0 = 646°$ K.

The heavy naphtha yield, i.e., the yield of product boiling between 180° F. and 380° F., was corrected for temperature and conversion. The following equation was used to calculate the heavy naphtha yield at common conditions of 725° F. and 77 weight percent conversion.

$$H_0 = H + 15.5 \times 10^4 \left(\frac{1}{T_0} - \frac{1}{T}\right) + 7.5 \times 10^8 \left(\frac{1}{T_0} - \frac{1}{T}\right)^2 + 13.2 \log\left(\frac{100 - C_0}{100 - C}\right)$$

where $H_0$ = heavy naphtha yield at 725° F. and 77 weight percent conversion,
H = observed heavy naphtha yield, in weight percent,
$T_0 = 658°$ K. (725° F.)
T = observed temperature in ° K.,
$C_0 = 77$ weight percent conversion, and
C = observed conversion.

The heavy naphtha yield was used to express catalyst slectivity.

EXAMPLE

Four catalysts were tested under hydrocracking conditions that fall within the ranges established for the process of the present invention. These catalysts are hereinafter designated as Catalysts A, B, C, and D.

Catalyst A was a commercially prepared catalyst. It had a catalyst support comprising 35 weight percent ultrastable, large-pore crystalline aluminosilicate material suspended in a porous matrix of a low-alumina (about 13 weight percent alumina) silica-alumina material. Cobalt and molybdenum were impregnated into this catalyst support by means of a solution of cobalt acetate and a solution of ammonium molybdate, respectively. Catalyst A was found to contain 2.52 weight percent CoO and 9.46 weight percent $MoO_3$.

Catalyst B was prepared in the laboratory. A 250-gram portion of ultrastable, large-port crystalline aluminosilicate material, having a sodium content of 2.20 weight percent sodium, was cation-exchanged with ammonium sulfate solution for 4 hours at 90° C. (194° F.). The ammonium sulfate solution had been prepared by dissolving 157 grams of ammonium sulfate in 1.5 liters of distilled water. Contacting the aluminosilicate material with the solution was carried out with stirring. The cation-exchanged aluminosilicate material was filtered and water-washed with approximately 1.5 gallons of hot distilled water (about 160° F.) in 500-ml. increments. The cation-exchange procedure was repeated two times. After the last exchange, the aluminosilicate material was washed free of sulfate anion, dried in air at 250° F. for about 2 to 3 hours at an air flow rate of about 1.5 cubic feet per hour, and calcined for 1 hour at a temperature of about 1490° F. in air flowing at a rate of about 1.5 cubic feet per hour. The sodium content of the ultrastable, large-pore crystalline aluminosilicate material was reduced to 0.58 weight percent. A 70-gram portion of the above-described exchanged ultrastable, large-port crystalline aluminosilicate material was blended into 1384 grams of alumina gel (9.4 weight percent alumina) obtained from the American Cyanamid Company. The resulting mixture was gelled with 100 ml. of 10 percent aqueous ammonium hydroxide solution, dried in air at a temperature of about 250° F. and an air flow rate of about 1.5 cubic feet per hour for about 2 to 3 hours, and calcined for 2 hours in air at a temperature of about 1000° F. and an air flow rate of about 1.5 cubic feet per hour. The calcined material had a sodium content of 0.20 weight percent. The material was pulverized to pass through a 30-mesh sieve (U.S. Sieve). A 150-gram portion of the pulverized material was impregnated with a solution prepared by dissolving 14.6 grams of cobalt acetate and 18.2 grams of ammonium molybdate in 125 ml. of hot distilled water (about 160° F.). The solution had a pH of about 5.0, the pH being adjusted by the addition of acetic acid. The impregnated material was dried in air at a temperature of about 250° F. and an air flow rate of about 1.5 cubic feet per hour for 2 to 3 hours, pelleted into ¼" x ¼" pellets (with about 4 weight percent Sterotex), and was calcined in air for 4 hours at a temperature of about 1,000° F. and an air flow rate of about 1.5 cubic feet per hour. Catalyst B was prepared to contain 2.5 weight percent CoO and 10 weight percent $MoO_3$.

Catalyst C was prepared in the laboratory. A 445-gram portion of $Al(NO_3)_3 \cdot 9H_2O$ was dissolved in 200 ml. of distilled water. The resulting solution was added to a solution that had been prepared by diluting 53 ml. of 85 percent $H_3PO_4$ with 150 ml. of distilled water. The resulting solution was then cooled to 0° C., and 500 ml. of ethylene oxide were slowly added thereto so that the temperature thereof did not exceed 10° C. The solution was stirred constantly during this addition. The solution was permitted to stand overnight to form a gel, which contained 10 percent solids. A 70-gram portion of cation-exchanged ultrastable, large-port crystalline aluminosilicate material prepared as described for Catalyst B above was blended with 1,300 grams of the above-described aluminum phosphate gel. Sufficient distilled water was added to this mixture to make a smooth mixture, which was then dried in air for about 2 to 3 hours at a temperature of about 250° F. and an air flow rate of about 1.5 cubic feet per hour, and subsequently calcined in air at a temperature of about 1,000° F. and an air flow rate of about 1.5 cubic feet per hour for about 2 hours. The calcined material was found to contain 0.21 weight percent sodium. An 87.5-gram portion of the calcined support material, pulverized to pass through a 30-mesh sieve (U.S. Sieve), was impregnated with 100 ml. of a solution that had been prepared by combining two solutions. The first solution had been prepared by dissolving 12.1 grams of ammonium molybdate in 50 ml. of hot distilled water (about 160° F.). The second solution had been prepared by dissolving 8.4 grams of cobalt acetate in 50 ml. of hot distilled water (about 160° F.), adjusted to a pH of 5.0 with acetic acid. The impregnated material was dried in air for about 2 to 3 hours at a temperature of about 250° F. and an air flow rate of about 1.5 cubic feet per hour, pelleted into ¼" x ¼" pellets (with about 4 weight percent Sterotex), and calcined for 4 hours in air at a temperature of about 1,000° F. and an air flow rate of about 1.5 cubic feet per hour. Catalyst C was prepared to contain 2.5 weight percent CoO and 10 weight percent $MoO_3$.

Catalyst D was prepared in the laboratory. A 217-gram portion of Du Pont AS Ludox silica sol (30 percent silica) was treated with acetic acid to adjust its pH to 5.0. The sol was gelled overnight. A 700-gram portion of ultrastable, large-pore crystalline aluminosilicate material, having a sodium content of 2.20 weight percent sodium, was cation-exchanged with ammonium sulfate solution for 4 hours at 90° C. (194° F.). The ammonium sulfate solution had been prepared by dissolving 1 pound of ammonium sulfate in 4.0 liters of distilled water. Contacting the aluminosilicate material with the solution was carried out with constant stirring. The cation-exchanged aluminosilicate material was filtered and water-washed with approximately 1.5 gallons of hot distilled water (about 160° F.) in 500-ml. increments. The cation-exchange procedure was repeated twice. After the last exchange, the aluminosilicate material was washed free of sulfate anion, dried in air at 250° F. for about 3 hours at an air flow rate of about 1.5 cubic feet per hour, and calcined for 3 hours at a temperature of about 1,490° F. in air flowing at the rate of about 1.5 cubic feet per hour. The sodium content of the ultrastable, large-pore crystalline aluminosilicate material was reduced to 0.35 weight percent. The above-described silica gel was blended with a 35-gram portion of the above-described cation-exchanged ultrastable, large-pore crystalline aluminosilicate material. The resultant blend was dried in air for 16 hours at a temperature of about 250° F. and an air flow rate of about 1.5 cubic feet per hour. The dried material was then ground to pass through a 30-mesh sieve (U.S. Sieve) and subsequently calcined for 1 hour in air at a temperature of about 1,000° F. and an air flow rate of about 1.5 cubic feet per hour. An 87-gram portion of the above-prepared support was impregnated with a solution that had been prepared by combining two solutions. The first of these was prepared by dissolving 8.4 grams of cobalt acetate in 50 ml. of hot distilled water (about 160° F.) and adjusting the resultant solution to a pH of 5.0 with acetic acid. The second solution was prepared by dissolving 12.1 grams of ammonium molybdate in 50 ml. of hot distilled water (about 160° F.). The impregnated material was dried in air at a temperature of about 250° F. for about 2 to 3 hours and air flow rate of about 1.5 cubic feet per hour, pelleted into ¼" x ¼" pellets (with about 4 weight percent Sterotex), and calcined for 3 hours in air at a temperature of about 1,000° F. and an air flow rate of about 1.5 cubic feet per hour. Catalyst D was prepared to contain 2.5 weight percent CoO and 10 weight percent $MoO_3$.

The results of the hydrocracking tests made with the above-described catalysts under conditions within the ranges suggested for the hydrocracking process of the present invention are presented in Table II.

TABLE II.—CATALYST PERFORMANCE

| Catalyst | A | B | C | D |
|---|---|---|---|---|
| Porous, non-crystalline support material | $SiO_2$—$Al_2O_3$ | $Al_2O_3$ | $Al(PO_4)$ | $SiO_2$ |
| Relative hydrocracking activity | 100 | 95 | 91 | 67 |
| Heavy naphtha yield | 59.1 | 62.3 | 59.7 | 62.2 |

The results of these tests indicate that the embodiments of the catalytic composition of the present invention, i.e., Catalysts B, C, and D, provide heavy naphtha yields which are superior to the heavy naphtha yields produced by a typical prior art catalysts, Catalyst A. In addition, Catalysts B and C provide hydrocracking activities that are almost identical to that of the reference Catalyst A.

Surprisingly, the catalytic composition and the hydrocracking process of the present invention provide improved heavy naphtha yields.

What is claimed is:

1. A catalytic composition comprising as a hydrogenation component a member selected from the group consisting of (1) a metal from Group VI–A of the Periodic Table of Elements and a metal from Group VIII of the Periodic Table of Elements, (2) their oxides, (3) their sulfides, and (4) mixtures thereof and a co-catalytic acidic support comprising ultrastable, large-pore crystalline aluminosilicate material and a porous support material selected from the group consisting of alumina, aluminum phosphate, and silica, said large-pore crystalline aluminosilicate material being characterized by a maximum cubic unit cell dimension of 24.55 angstrom units, a hydroxyl infrared band near 3700 cm.$^{-1}$ and a hydroxyl infrared band near 3625 cm.$^{-1}$, an alkali metal content of less than 1 weight percent, and a pore size of at least 9 to 10 angstrom units.

2. The catalytic composition of claim 1 wherein said large-pore crystalline aluminosilicate material is suspended in the porous matrix of said porous support material.

3. The catalytic composition of claim 1 wherein said large-pore crystalline aluminosilicate material is present in an amount within the range of about 5 weight percent to about 70 weight percent, based upon the weight of said support.

4. The catalytic composition of claim 2 wherein said large-pore crystalline aluminosilicate material is present in an amount within the range of about 5 weight percent to about 70 weight percent, based upon the weight of said support.

5. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 1, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

6. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 3, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

7. A process for he hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 4, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

8. The catalytic composition of claim 4 wherein said metal from Group VI-A is molybdenum and said metal from Group VIII is cobalt.

9. The catalytic composition of claim 4 wherein said metal from Group VI-A is tungsten and said metal from Group VIII is nickel.

10. The catalytic composition of claim 8, wherein said cobalt is present in an amount within the range of about 2 weight percent to about 5 weight percent, calculated as CoO and based upon the total weight of said catalyst, and said molybdenum is present in an amount within the range of about 4 weight percent to about 15 weight percent, calculated as MoO₃ and based upon the total weight of said catalyst.

11. The catalytic composition of claim 9, wherein said nickel and tungsten are present in a total amount within the range of about 0.02 to about 0.15 gram-atom of nickel and tungsten per 100 grams of catalyst and in a sungsten-to-nickel ratio within the range of about 0.5 to about 5.0.

12. The catalytic composition of claim 10 wherein said porous support material is alumina.

13. The catalytic composition of claim 11 wherein said porous support material is alumina.

14. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 10 said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

15. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 11, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

16. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 12, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

17. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 13 said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

18. The catalytic composition of claim 10 wherein said porous support material is aluminum phosphate.

19. The catalytic composition of claim 11 wherein said porous support material is aluminum phosphate.

20. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 18, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F to about 850° F., and a LHSV within the range of about 0.1 to about 10 volume of hydrocarbon per hour per volume of catalyst.

21. A process for the hydrocracking of a petroleum hydrocarbon fraction which boils in the range of about 350° F. to about 1,000° F., which process comprises contacting in a hydrocracking reaction zone under hydrocracking conditions and in the presence of hydrogen said hydrocarbon fraction with the catalytic composition of claim 19, said hydrocracking conditions comprising a hydrogen-to-oil ratio within the range of about 5,000 s.c.f.b. to about 20,000 s.c.f.b., a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

References Cited

UNITED STATES PATENTS

| | | | |
|---|---|---|---|
| 3,140,253 | 7/1964 | Plank et al. | 208—120 |
| 3,425,956 | 2/1969 | Baker et al. | 252—455 |
| 3,536,605 | 10/1970 | Kitrell | 252—455 Z |

DELBERT E. GANTZ, Primary Examiner

G. E. SCHMITKONS, Assistant Examiner

U.S. Cl. X.R.

208—136; 252—435, 436, 437, 439, 455 Z, 458; 260—672 T

PO-1050
(5/69)

UNITED STATES PATENT OFFICE
CERTIFICATE OF CORRECTION

Patent No. 3,649,523          Dated March 14, 1972

Inventor(s) Ralph J. Bertolacini and Louis C. Gutberlet

It is certified that error appears in the above-identified patent and that said Letters Patent are hereby corrected as shown below:

Column 5, line 28, "optionally" should be --optimally--.

Column 10, line 25, "(s.c.f.m.p.)" should be --(SCFHP)--.

Column 15, line 10, in Claim 7, "he" should be --the--.

Column 15, line 41, in Claim 11, "sungsten" should be --tungsten--.

Signed and sealed this 19th day of September 1972.

(SFAL)
Attest:

EDWARD M. FLETCHER JR.
Attesting Officer

ROBERT GOTTSCHALK
Commissioner of Patents